United States Patent
Sun et al.

(10) Patent No.: US 12,062,513 B2
(45) Date of Patent: Aug. 13, 2024

(54) CIRCUIT ELEMENT PROTECTION APPARATUS AND PROTECTION METHOD FOR CIRCUIT ELEMENTS

(71) Applicant: JESS-LINK PRODUCTS CO., LTD., New Taipei (TW)

(72) Inventors: Chi-Hsien Sun, New Taipei (TW); Ching-Hung Liu, New Taipei (TW); Chieh-Ming Cheng, New Taipei (TW)

(73) Assignee: JESS-LINK PRODUCTS CO., LTD., New Taipei (TW)

( * ) Notice: Subject to any disclaimer, the term of this patent is extended or adjusted under 35 U.S.C. 154(b) by 329 days.

(21) Appl. No.: 17/569,697

(22) Filed: Jan. 6, 2022

(65) Prior Publication Data
US 2023/0162938 A1  May 25, 2023

(30) Foreign Application Priority Data
Nov. 24, 2021 (TW) .................. 110143767

(51) Int. Cl.
*H01H 71/08* (2006.01)
*H01R 13/422* (2006.01)

(52) U.S. Cl.
CPC ......... *H01H 71/08* (2013.01); *H01R 13/4223* (2013.01)

(58) Field of Classification Search
CPC ..... H01H 71/08; H01R 13/4223; H02H 3/087
USPC .......................................................... 361/94
See application file for complete search history.

(56) References Cited

U.S. PATENT DOCUMENTS

| | | | | |
|---|---|---|---|---|
| 10,133,692 | B2* | 11/2018 | Huh | G11C 7/1093 |
| 10,437,317 | B2* | 10/2019 | Green | G06F 13/4022 |
| 10,901,041 | B2* | 1/2021 | Nagasue | G01R 31/396 |
| 2011/0185215 | A1* | 7/2011 | Neben | G06F 1/12 |
| | | | | 713/401 |
| 2017/0060791 | A1* | 3/2017 | Huh | G06F 13/36 |

FOREIGN PATENT DOCUMENTS

| CN | 105915204 A | * | 8/2016 | ........... H03K 17/687 |
|---|---|---|---|---|
| CN | 106129672 B | * | 1/2019 | ........... H01R 12/721 |

OTHER PUBLICATIONS

Active, self adjusting L-S band MMIC filters, Katzin, Aparin, 1994 IEEE GaAs IC symposium-41 (Year: 1994).*

* cited by examiner

*Primary Examiner* — Thienvu V Tran
*Assistant Examiner* — Sreeya Sreevatsa
(74) *Attorney, Agent, or Firm* — Chun-Ming Shih; HDLS IPR SERVICES

(57) ABSTRACT

A circuit element protection apparatus applied to a signal input terminal, the circuit element protection apparatus includes a slave processing unit, a main processing unit, a first soft start unit and a second soft start unit. The first soft start unit receives a signal from the signal input terminal, and is used for noise filtering on the signal and delayed a transmission of the signal to the slave processing unit. The second soft start unit receives the signal from the signal input terminal, and is used for noise filtering on the signal and delayed the transmission of the signal to the main processing unit. The present disclosure further includes a protection method for circuit elements.

10 Claims, 3 Drawing Sheets

CIRCUIT ELEMENT PROTECTION APPARATUS AND PROTECTION METHOD FOR CIRCUIT ELEMENTS

BACKGROUND

Technical Field

The present disclosure is related to a circuit element protection apparatus and method thereof, in particular to a circuit element protection apparatus and method thereof with a time difference of soft start.

Description of Related Art

Generally, connectors have been widely used in various electrical products in various fields. With power supply requirements of different electrical products, the connectors must be designed accordingly, and various connectors have been derived. Connectors have been commonly used to transmit signals or power. Connectors play an extremely important role among electrical products or machines. For example, a connector is generally applied to a huge current AC power connector, in order to make a terminal of the connector have sufficient current withstand capability, in addition to a selection of materials, a size of the connector must also be enlarged or thickened. With a rapid development of science and technology, a demand for data processing speed, capacity and functions has increased rapidly, and cables required for connectors have also increased. Especially, in view of different control units or processing units, it is necessary to consider safe operation specifications of each component (such as current or voltage limit range, etc.). For this reason, a circuit protection unit with current limiting or voltage limiting function is usually introduced at a front end of the connector to prevent some components from being broken down by noise or surge, so as to reduce maintenance costs.

When using the circuit protection unit in a related art, all components coupled to a rear end of the connector are subject to a same safety operation specification, which may be regarded as filtering all components with a single circuit protection unit. Please refer to FIG. 1 for an implementation aspect of a protection circuit in the related art. A soft start unit 10 is arranged between a golden finger 100 and IC/MCU. An advantage is that a single soft start unit 10 may be used to all of next-level electronic components (for example, IC/MCU, etc.) are protected (for example, to prevent the electronic components from being damaged by current surges). However, for some products such as Mini SAS HD, it must start a MCU before starting an IC. Therefore, the design as shown in FIG. 1 will affect a transmission of the signal for starting or operating the electronic components that with a master-slave relationship with each other, and may even fail to operate normally, causing inconvenience in operation. In addition, please refer to FIG. 2 for another implementation aspect of the protection circuit in the related art. In a related art method, when some problems of FIG. 1 are to be improved to further adapt the circuit, some related arts use a circuit design to exclude a soft start unit 10 from a connected to a MCU in order to achieve a purpose of starting the MCU first and then starting the IC. However, in this way, the MCU will no longer be protected by the soft start unit 10, and there is still a technical problem that the MCU is easily damaged by current surges.

Therefore, how to design a circuit element protection apparatus and a method thereof, in particular to solve the aforementioned technical problems of the related art, is an important subject studied by the inventor of the present disclosure.

SUMMARY

One purpose of the present disclosure is to provide a circuit element protection apparatus, which solves a technical problem in a related art that may not take into account safety operation specifications of all components and a master-slave relationship of each of the components. To achieve a purpose of saving maintenance costs of the components and improving a convenience with an operation of the components.

In order to achieve the purpose of the present disclosure, the circuit element protection apparatus applied to a signal input terminal, and the circuit element protection apparatus includes a slave processing unit, a main processing unit, a first soft start unit, and a second soft start unit. The main processing unit is electrically coupled to the slave processing unit, and the main processing unit controls the slave processing unit. The first soft start unit is arranged between the signal input terminal and the slave processing unit, the first soft start unit receives a signal from the signal input terminal, performs noise filtering on the signal, and delays a transmission of the signal to the slave processing unit. The second soft start unit is arranged between the signal input terminal and the main processing unit, the second soft start unit receives the signal from the signal input terminal, performs noise filtering on the signal, and delays the transmission of the signal to the main processing unit. A time for delaying the transmission of the signal by the first soft start unit is greater than the time for delaying the transmission of the signal by the second soft start unit.

Further, in the circuit element protection apparatus, the first soft start unit includes a band pass filter or a band stop filter.

Further, in the circuit element protection apparatus, the second soft start unit includes a band pass filter or a band stop filter.

Further, the circuit element protection apparatus further includes an integrated circuit, the integrated circuit is electrically coupled to the signal input terminal, the first soft start unit and the second soft start unit. The integrated circuit controls at least one of the first soft start unit and the second soft start unit to adjust the time for delaying the transmission of the signal by at least one of the first soft start unit and the second soft start unit.

Further, the circuit element protection apparatus further includes a third soft start unit, the third soft start unit is arranged between the signal input terminal and the integrated circuit, the third soft start unit receives the signal from the signal input terminal, performs noise filtering on the signal, and delays the transmission of the signal to the integrated circuit.

Further, the circuit element protection apparatus further includes an integrated circuit, the integrated circuit is electrically coupled to the signal input terminal, the first soft start unit and the second soft start unit. The integrated circuit individually adjusts a time for transmitting the signal to the first soft start unit and a time for transmitting the signal to the second soft start unit.

Another purpose of the present disclosure is to provide a protection method for circuit elements, which solves a technical problem in the related art that may not take into account safety operation specifications of all components and the master-slave relationship of each of the components, thus achieve a purpose of saving maintenance costs of the components and improving a convenience with an operation of the components.

In order to achieve the purpose of the present disclosure, the protection method for circuit elements is applied to a signal input terminal, a slave processing unit, a main processing unit, a first soft start unit and a second soft start unit. The protection method includes the following steps: The first soft start unit receives a signal from the signal input terminal, the first soft start unit performs noise filtering on the signal, and delays a transmission of the signal to the slave processing unit. The second soft start unit receives the signal from the signal input terminal, the second soft start unit performs noise filtering on the signal, and delays the transmission of the signal to the main processing unit. The main processing unit controls the slave processing unit. A time for delaying the transmission of the signal by the first soft start unit is greater than the time for delaying the transmission of the signal by the second soft start unit.

Further, the protection method for circuit elements further includes the following step: An integrated circuit controls at least one of the first soft start unit and the second soft start unit to adjust the time for delaying the transmission of the signal by at least one of the first soft start unit and the second soft start unit.

Further, the protection method for circuit elements further includes the following step: An integrated circuit individually adjusts a time for transmitting the signal to the first soft start unit and a time for transmitting the signal to the second soft start unit.

When using the circuit element protection apparatus and the protection method for circuit elements of the present disclosure, the first soft start unit and the second soft start unit filters and delays the transmission of the signal respectively, so that the slave processing unit and the main processing unit are all protected by noise filtering. The present disclosure avoids a situation in which some components are broken down by noise or surge, so as to reduce maintenance costs. The present disclosure also takes into account a linkage relationship of the slave processing unit being controlled by the main processing unit, and the present disclosure introduces a framework in which the time for delaying the transmission of the signal by the first soft start unit is greater than the time for delaying the transmission of the signal by the second soft start unit. In this way, there is a time difference between the first soft start unit and the second soft start unit for the delayed transmission of the signal, so that the components with a master-slave relationship will operate normally.

For this reason, the circuit element protection apparatus and the protection method for circuit elements of the present disclosure, which solves the technical problem in a related art that may not take into account safety operation specifications of all components and a master-slave relationship of each of the components. To achieve the purpose of saving maintenance costs of the components and improving a convenience with an operation of the components.

In order to further understand the techniques, means, and effects of the present disclosure for achieving the intended purpose. Please refer to the following detailed description and drawings of the present disclosure. The drawings are provided for reference and description only, and are not intended to limit the present disclosure.

DETAILED DESCRIPTION

Figure 1:
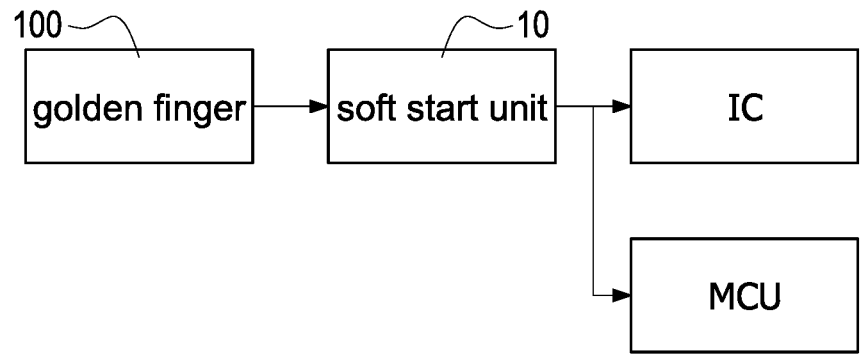
FIG. 1 is an implementation aspect of a protection circuit in a related art.
Figure 2:
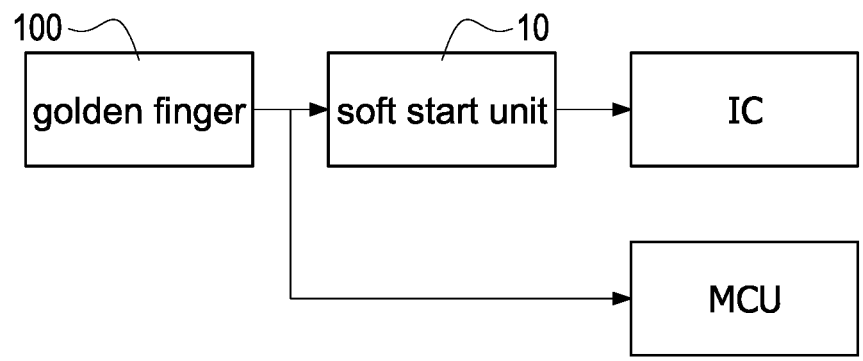
FIG. 2 is another implementation aspect of the protection circuit in the related art.

The following are specific examples to illustrate some implementations of the present disclosure. A person skilled in the art may understand the advantages and effects of the present disclosure from the content disclosed in this specification. The present disclosure may be implemented or applied through other different specific embodiments, and various details in this specification may also be based on different viewpoints and applications, and various modifications and changes may be made without departing from the concept of the present disclosure.

It should be understood that the structures, the proportions, the sizes, the number of components, and the like in the drawings are only used to cope with the contents disclosed in the specification for understanding and reading by those skilled in the art, and it is not intended to limit the conditions that may be implemented in the present disclosure, and thus is not technically significant. Any modification of the structure, the change of the proportional relationship, or the adjustment of the size, should be within the scope of the technical contents disclosed by the present disclosure without affecting the effects and the achievable effects of the present disclosure.

The technical content and detailed description of the present disclosure will be described below in conjunction with the drawings.

Figure 3:
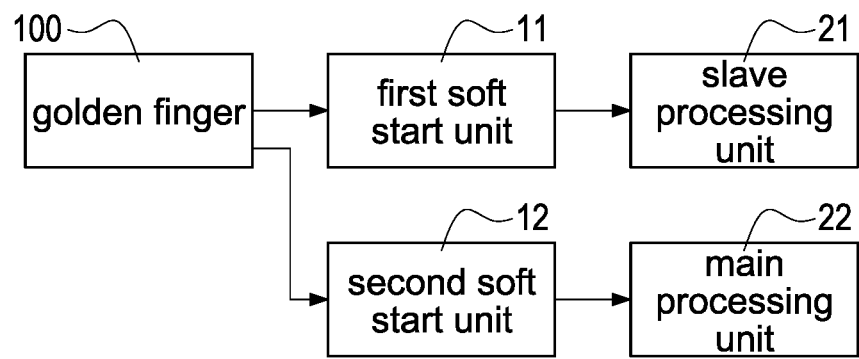
FIG. 3 is a system architecture diagram of a first embodiment of a circuit element protection apparatus of the present disclosure.

Please refer to the FIG. 3, which is a system architecture diagram of a first embodiment of a circuit element protection apparatus of the present disclosure. The circuit element protection apparatus is applied to a signal input terminal. In the first embodiment of the present disclosure, the signal input terminal is a golden finger 100 of a connector. The circuit element protection apparatus includes a slave processing unit 21, a main processing unit 22, a first soft start unit 11, and a second soft start unit 12. The main processing unit 22 is electrically coupled to the slave processing unit 21, and the main processing unit 22 controls the slave processing unit 21. The first soft start unit 11 is arranged between the golden finger 100 and the slave processing unit 21, the first soft start unit 11 receives a signal from the golden finger 100, performs noise filtering on the signal, and delays a transmission of the signal to the slave processing unit 21. The second soft start unit 12 is arranged between the golden finger 100 and the main processing unit 22, the second soft start unit 12 receives the signal from the golden finger 100, performs noise filtering on the signal, and delays the transmission of the signal to the main processing unit 22. In some embodiments, a time for delaying the transmission of the signal by the first soft start unit 11 is longer than the time for delaying the transmission of the signal by the second soft start unit 12.

In the first embodiment of the present disclosure, the first soft start unit 11 may include a band pass filter or a band stop filter, and the second soft start unit 12 may include a band pass filter or a band stop filter. Both the first soft start unit 11 and the second soft start unit 12 may adjust their own RLC circuit (that is, the RLC circuit may include a resistance (R), an inductance (L), and a capacitor (C)) to adjust the time for delaying the transmission of the signal. The time may be, for example, 800 milliseconds, 400 milliseconds, 1.2 microseconds, 100 microseconds, and so on. However, the present disclosure is not limited thereto. Further, the slave processing unit 21 may be an integrated circuit (IC) with a specific function, and the main processing unit 22 may be a microcontroller (MCU), a micro processing unit (MPU), or a central processing unit (CPU), digital signal processor (DSP), graphics processing unit (GPU), etc. However, the present disclosure is not limited thereto.

Figure 4:
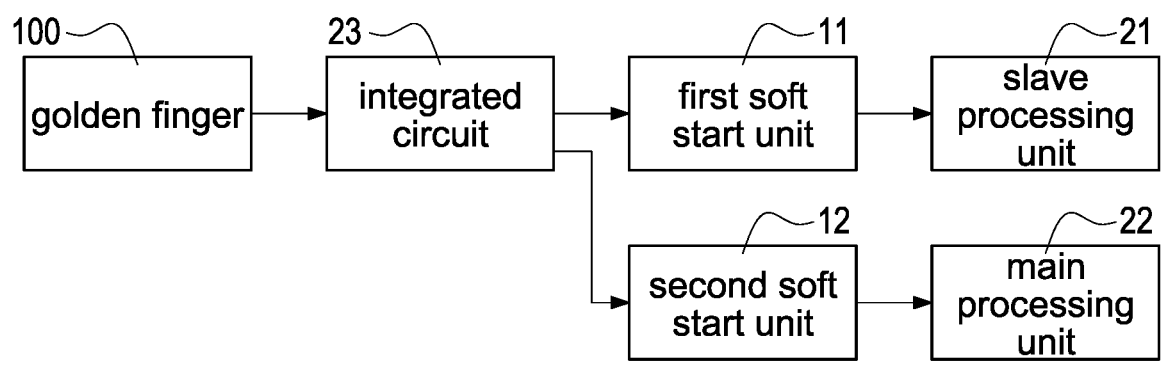
FIG. 4 is a system architecture diagram of a second embodiment of the circuit element protection apparatus of the present disclosure.

FIG. 4 is a system architecture diagram of a second embodiment of the circuit element protection apparatus of the present disclosure. The second embodiment in the present disclosure is similar to the aforementioned first embodiment, but the second embodiment further includes an integrated circuit 23. The integrated circuit 23 is electrically coupled to the golden finger 100, the first soft start unit 11 and the second soft start unit 12. The integrated circuit 23 has the following two implementation aspects.

One implementation aspect is that the integrated circuit 23 controls at least one of the first soft start unit 11 and the second soft start unit 12 to adjust the time for delaying the transmission of the signal by at least one of the first soft start unit 11 and the second soft start unit 12. That is, both the first soft start unit 11 and the second soft start unit 12 may be controlled by an instruction of the integrated circuit 23, and both are adjustable. The integrated circuit 23 may adjust at least one of the first soft start unit 11 and the second soft start unit 12 according to user needs, so that the slave processing unit 21 and the main processing unit 22 receive the signal at the same time or receive the signal at different time.

Another implementation aspect is that the integrated circuit 23 individually adjusts a time for transmitting the signal to the first soft start unit 11 and a time for transmitting the signal to the second soft start unit 12. That is, both the first soft start unit 11 and the second soft start unit 12 are hardware architectures for controlling the time for delaying the transmission, and both are non-adjustable. The integrated circuit 23 may adjust at least one of the first soft start unit 11 and the second soft start unit 12 according to user needs, so that the slave processing unit 21 and the main processing unit 22 receive the signal at the same time or receive the signal at different time.

In the second embodiment of the present disclosure, the integrated circuit 23 may be a field programmable gate array (FPGA), a programmable logic device (PLD), a complex programmable logic device (CPLD), or an application specific integrated circuit (ASIC), etc. However, the present disclosure is not limited thereto.

Figure 5:
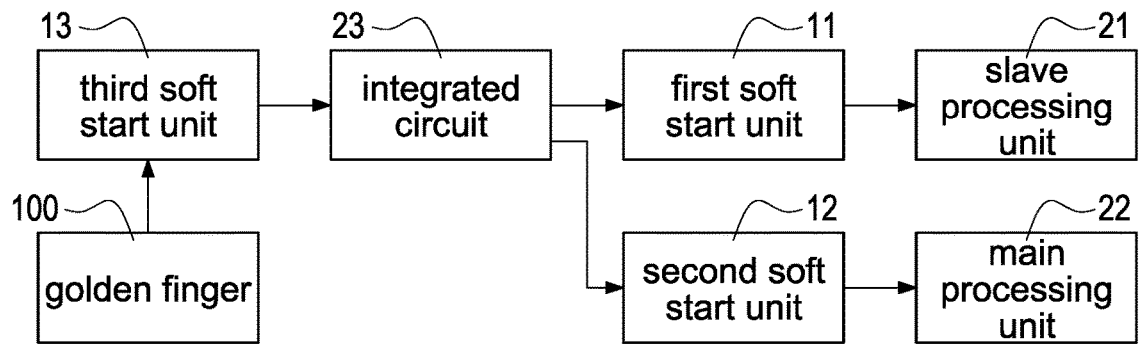
FIG. 5 is a system architecture diagram of a third embodiment of the circuit element protection apparatus of the present disclosure.

FIG. 5 is a system architecture diagram of a third embodiment of the circuit element protection apparatus of the present disclosure. The third embodiment in the present disclosure is similar to the aforementioned second embodiment, but the third embodiment further includes a third soft start unit 13. The third soft start unit 13 is arranged between the golden finger 100 and the integrated circuit 23, the third soft start unit 13 receives a signal from the golden finger 100, performs noise filtering on the signal, and delays the transmission of the signal to the integrated circuit 23.

Figure 6:
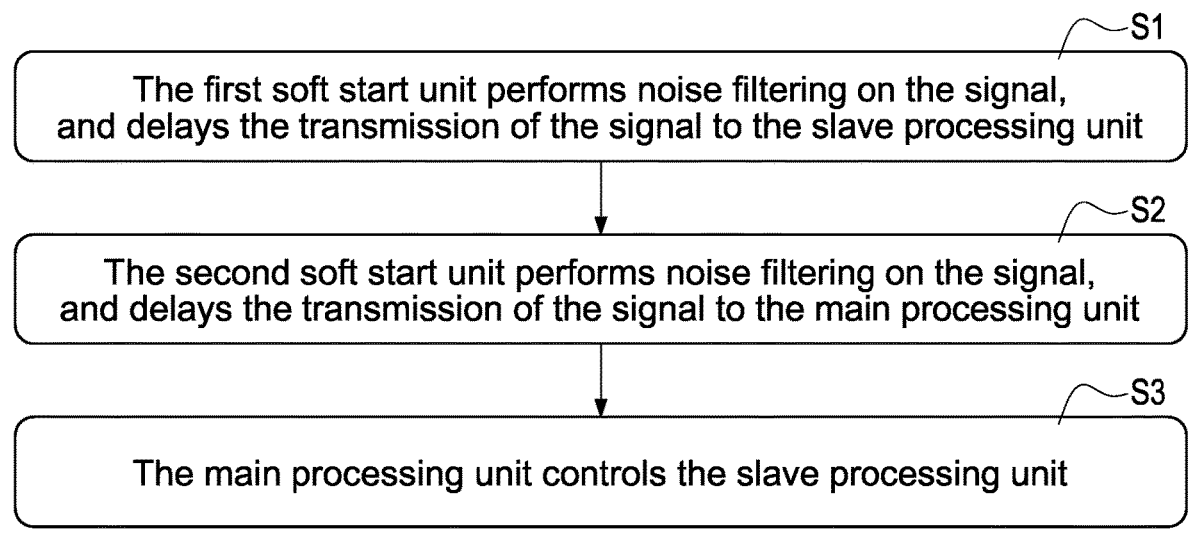
FIG. 6 is a flow chart of a protection method for circuit elements of the present disclosure.

FIG. 6 is a flow chart of a protection method for circuit elements of the present disclosure. The protection method for circuit elements of the present disclosure includes the following steps: The first soft start unit 11 receives the signal from the signal input terminal (i.e., the golden finger 100), performs noise filtering on the signal, and delays the transmission of the signal to the slave processing unit 21 (step S1). The second soft start unit 12 receives the signal from the golden finger 100, performs noise filtering on the signal, and delays the transmission of the signal to the main processing unit 22 (step S2). The main processing unit 22 controls the slave processing unit 21 (step S3).

Further, the first soft start unit 11, the second soft start unit 12, and/or the third soft start unit 13 may be an electronic component in the related art that limit an inrush current and limit abnormal conditions such as arc or high voltage caused by the inrush current. A soft start unit (i.e., the first soft start unit 11, the second soft start unit 12, and/or the third soft start unit 13) may reduce a stress on another electronic components, extend the life of the electronic components, and improve a reliability of whole system. In some embodiments, the soft start unit may be an inrush current limiter. In actual operation, a circuit composed of a filters, resistors, or a thermistor with negative temperature coefficient (NTC) may form the first soft start unit 11, the second soft start unit 12, and/or the third soft start unit 13. However, the present disclosure is not limited thereto.

When using the circuit element protection apparatus of the present disclosure, the first soft start unit 11 and the second soft start unit 12 filters and delays the transmission of the signal respectively, so that the slave processing unit 21 and the main processing unit 22 are all protected by noise filtering. The present disclosure avoids a situation in which some components are broken down by noise or surge, so as to reduce maintenance costs. The present disclosure also takes into account a linkage relationship of the slave processing unit 21 being controlled by the main processing unit 22, and the present disclosure introduces a framework in which the time for delaying the transmission of the signal by the first soft start unit 11 is longer than the time for delaying the transmission of the signal by the second soft start unit 12. In this way, there is a time difference between the first soft start unit and the second soft start unit for the delayed transmission of the signal, so that the components with a master-slave relationship will operate normally.

For this reason, the circuit element protection apparatus and the protection method for circuit elements of the present disclosure may solve the technical problem in the related art that may not take into account safety operation specifications of all components and a master-slave relationship of each of the components. Besides, the circuit element protection apparatus and the protection method for circuit elements of the present disclosure also achieve the purpose of saving maintenance costs of the components and improving a convenience with an operation of the components.

The above is only a detailed description and drawings of the preferred embodiments of the present disclosure, but the features of the present disclosure are not limited thereto, and are not intended to limit the present disclosure. All the scope of the present disclosure shall be subject to the scope of the following claims. The embodiments of the spirit of the present disclosure and its similar variations are intended to be included in the scope of the present disclosure. Any variation or modification that may be easily conceived by those skilled in the art in the field of the present disclosure may be covered by the following claims.

What is claimed is:

1. A circuit element protection apparatus applied to a golden finger of a connector, the circuit element protection apparatus comprising:
   a slave processing unit;
   a main processing unit, electrically coupled to the slave processing unit, and the main processing unit configured to control the slave processing unit;
   a first RLC circuit, arranged between the finger of the golden finger of the connector and the slave processing unit, the first RLC circuit configured to receive a signal from the golden finger of the connector, perform noise filtering on the signal, and delay a transmission of the signal to the slave processing unit; and
   a second RLC circuit, arranged between the golden finger of the connector and the main processing unit, the second RLC circuit configured to receive the signal from the golden finger of the connector, perform noise filtering on the signal, and delay the transmission of the signal to the main processing unit;
   wherein, a time for delaying the transmission of the signal by the first RLC circuit is longer than the time for delaying the transmission of the signal by the second RLC circuit.

2. The circuit element protection apparatus in claim 1, wherein, the first RLC circuit comprises a band pass filter or a band stop filter.

3. The circuit element protection apparatus in claim 1, wherein, the second RLC circuit comprises a band pass filter or a band stop filter.

4. The circuit element protection apparatus in claim 1, further comprising:
   an integrated circuit, electrically coupled to the golden finger of the connector, the first RLC circuit and the second RLC circuit;
   wherein, the integrated circuit is configured to control at least one of the first RLC circuit and the second RLC circuit to adjust the time for delaying the transmission of the signal by at least one of the first RLC circuit and the second RLC circuit.

5. The circuit element protection apparatus in claim 4, further comprising:
   a third RLC circuit, arranged between the golden finger of the connector and the integrated circuit, the third RLC circuit configured to receive the signal from the golden finger of the connector, perform noise filtering on the signal, and delay the transmission of the signal to the integrated circuit.

6. The circuit element protection apparatus in claim 1, further comprising:
   an integrated circuit, electrically coupled to the golden finger of the connector, the first RLC circuit and the second RLC circuit;
   wherein, the integrated circuit is configured to individually adjust a time for transmitting the signal to the first RLC circuit and a time for transmitting the signal to the second RLC circuit.

7. The circuit element protection apparatus in claim 6, further comprising:
   a third RLC circuit, arranged between the golden finger of a connector and the integrated circuit, the third RLC circuit configured to receive the signal from the golden finger of the connector, perform noise filtering on the signal, and delay the transmission of the signal to the integrated circuit.

8. A protection method for circuit elements applied to a golden finger of the connector, a slave processing unit, a main processing unit, a first RLC circuit and a second RLC circuit, the protection method comprising:
   receiving, by the first RLC circuit, a signal from the golden finger of the connector, the first RLC circuit performing noise filtering on the signal, and delaying a transmission of the signal to the slave processing unit;
   receiving, by the second RLC circuit, the signal from the golden finger of the connector, the second RLC circuit performing noise filtering on the signal, and delaying the transmission of the signal to the main processing unit; and
   controlling, by the main processing unit, the slave processing unit;
   wherein, a time for delaying the transmission of the signal by the first RLC circuit is longer than the time for delaying the transmission of the signal by the second RLC circuit.

9. The protection method for circuit elements in claim 8, further comprising the following step:
   controlling, by an integrated circuit, at least one of the first RLC circuit and the second RLC circuit to adjust the time for delaying the transmission of the signal by at least one of the first RLC circuit and the second RLC circuit.

10. The protection method for circuit elements in claim 8, further comprising the following step:
    individually adjusting, by an integrated circuit, a time for transmitting the signal to the first RLC circuit and a time for transmitting the signal to the second RLC circuit.

* * * * *